(12) United States Patent
Kohno et al.

(10) Patent No.: US 7,827,693 B2
(45) Date of Patent: Nov. 9, 2010

(54) METHOD OF MANUFACTURING POWERTRAIN MEMBER

(75) Inventors: Tetsuya Kohno, Okazaki (JP); Yuji Yasuda, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1305 days.

(21) Appl. No.: 11/353,174

(22) Filed: Feb. 14, 2006

(65) Prior Publication Data

US 2006/0210354 A1    Sep. 21, 2006

(30) Foreign Application Priority Data

Mar. 16, 2005    (JP) .............................. 2005-075622

(51) Int. Cl.
*B21D 53/28* (2006.01)
*B21K 1/30* (2006.01)
*B23P 15/14* (2006.01)

(52) U.S. Cl. .................... 29/893.33; 29/893; 29/893.3; 29/557; 29/558

(58) Field of Classification Search .................. 29/893, 29/893.3, 893.33, 894, 894.01, 894.3, 557, 29/558, 412
See application file for complete search history.

(56) References Cited

U.S. PATENT DOCUMENTS

2006/0048365 A1* 3/2006 Bachelier .................. 29/412

FOREIGN PATENT DOCUMENTS

| GB | 2 039 662 A | 8/1980 |
|---|---|---|
| JP | 1-174505 | 12/1989 |
| JP | 2-155584 | 6/1990 |
| JP | 4-68242 | 6/1992 |
| JP | 10-110806 | 4/1998 |
| JP | 11-90736 | 4/1999 |
| JP | 2004-125054 | 4/2004 |
| JP | 2006-266495 | 10/2006 |

* cited by examiner

*Primary Examiner*—Rick K Chang
(74) *Attorney, Agent, or Firm*—Oblon, Spivak, McClelland, Maier & Neustadt, L.L.P.

(57) ABSTRACT

A method of manufacturing a powertrain member capable of suppressing an effect of heat distortion is provided. A method of manufacturing a powertrain member including a disk portion provided to extend from a boss portion in a direction perpendicular to a rotation axis and having a through hole formed in the disk portion includes the first through hole formation step of forming a tip hole which is at least a portion of the through hole, the chamfering step of chamfering at least a portion of the tip hole, the heat treatment step of performing heat treatment after chamfering, and the second through hole formation step of forming a desired shape of the through hole by laser processing after heat treatment.

3 Claims, 5 Drawing Sheets

METHOD OF MANUFACTURING POWERTRAIN MEMBER

This nonprovisional application is based on Japanese Patent Application No. 2005-075622 filed with the Japan Patent Office on Mar. 16, 2005, the entire contents of which are hereby incorporated by reference.

BACKGROUND OF THE INVENTION

1. Field of the Invention

The present invention relates to a powertrain member, more specifically, to a powertrain member mounted on a vehicle.

2. Description of the Background Art

A conventional powertrain member is disclosed in, for example, Japanese Utility Model Laying-Open No. 01-174505.

Japanese Utility Model Laying-Open No. 01-174505 discloses that, in a conventional powertrain member such as a gear, a through hole is provided in a disk portion for reducing a weight and a noise. When a through hole is provided in a powertrain member such as a transmission of an automobile which transmits relatively large mechanical power, though concentration of a stress around the through hole becomes a concern, the through hole may be provided before heat treatment. In this situation, an effect of heat distortion is increased. On the other hand, laser processing is preferably used to provide the through hole because the processing can be performed relatively readily. When a through hole is formed before heat treatment to such an extent that the effect of heat distortion can be ignored and then a desired through hole is formed after heat treatment by laser processing, however, the processing becomes difficult if the through hole is chamfered because a laser is reflected in a chamfer portion.

SUMMARY OF THE INVENTION

The present invention was made to solve the above-described problems. An object of the present invention is to provide a powertrain member capable of suppressing an effect of heat distortion and a method of manufacturing the same.

Another object of the present invention is to provide a powertrain member in which a through hole can be readily formed by laser processing and a method of manufacturing the same.

A method of manufacturing a powertrain member according to the present invention is a method of manufacturing a powertrain member including a disk portion provided to extend from a boss portion in a direction perpendicular to a rotation axis and having a through hole provided in the disk portion, which includes the first through hole formation step of forming at least a portion of the through hole, the chamfering step of chamfering a portion of the through hole in a circumferential direction, the heat treatment step of performing heat treatment after chamfering, and the second through hole formation step of forming a desired shape of the through hole by laser processing after heat treatment.

In the method of manufacturing a powertrain member constructed as such, heat treatment is performed after formation of a portion of the through hole in the first through hole formation step, and then the through hole is finished in the second through hole formation step. Therefore, the effect of heat distortion can be suppressed as compared to a situation in which a through hole is formed before heat treatment.

The chamfering step preferably includes the step of cutting the through hole formed in the first through hole formation step with a deviation of a center of a prescribed amount from a center of the through hole. In this situation, the through hole can be formed with laser processing which can be performed relatively readily while meeting a requirement for strength.

A powertrain member according to the present invention is manufactured by the method as described above and includes a boss portion and a disk portion provided to extend from the boss portion in a direction perpendicular to a rotation axis. A through hole is provided in the disk portion and a chamfer portion is provided in a portion of the through hole.

With the present invention, a method of manufacturing a powertrain member capable of suppressing an effect of heat distortion can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
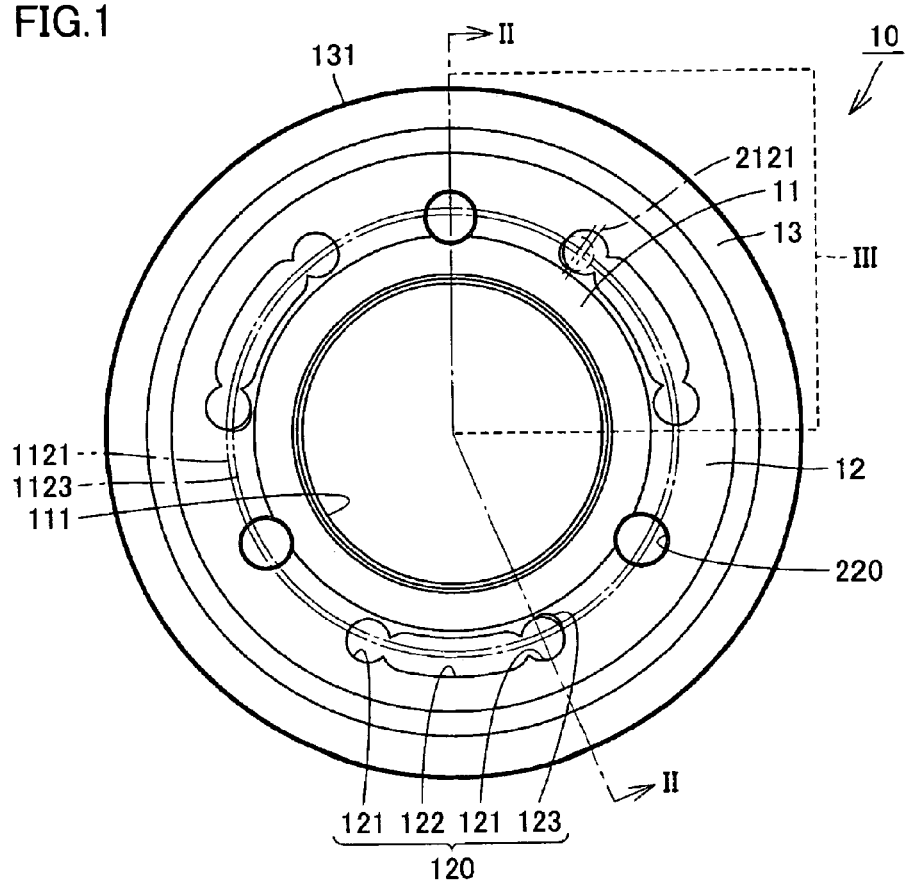
FIG. 1 is a plan view of a spiral gear according to a first embodiment of the present invention.

Embodiments of the present invention will now be described referring to the drawings. In the embodiments described below, the same or corresponding portions are indicated with the same reference characters and descriptions thereof will not be repeated.

First Embodiment

Figure 2:
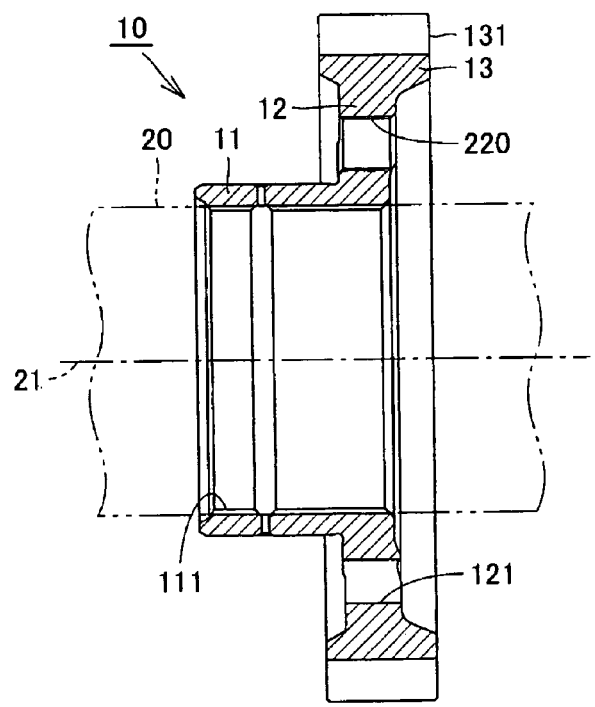
FIG. 2 is a cross-sectional view cut along the line II-II shown in FIG. 1.

As shown in FIGS. 1 and 2, a spiral gear 10 according to a first embodiment of the present invention has a boss portion 11, a disk portion 12 and a rim portion 13. Boss portion 11 is formed in a cylindrical shape and has a hole 111 for a shaft provided in a center portion thereof. A rotation shaft 20 is inserted into hole 111 for a shaft and attached by fitting. Disk portion 12 is a thin portion provided to extend outward from boss portion 11 in a radial direction of a rotation axis 21. Rim portion 13 is located on a periphery of disk portion 12. Teeth are formed on a peripheral surface of rim portion 13, and thereby a tooth surface 131 is formed.

Disk portion 12 has a plurality of through holes 120 each extending along a circumferential direction of the rotation axis. Through hole 120 extends in a direction parallel to an axis direction of the rotation axis and penetrates through disk portion 12. In spiral gear 10 in this embodiment, three through holes 120 are provided with regular intervals in the circumferential direction of the axis. Through hole 120 has tip holes 121, a communicating portion 122 linking tip holes 121, and a chamfer portion 123 provided on tip hole 121. Tip hole 121 is a cylindrical hole having a center on a center line 1121, which penetrates through disk portion 12. Chamfer portion 123 having a deviated center is provided on tip hole 121. Chamfer portion 123 is a circular hole having a center on a center line 1123. Communicating portion 122 is a long hole linking two tip holes 121, which extends along a circumferential direction of disk portion 12. Though a plurality of through holes 120 are arranged with regular intervals in this embodiment, it is not necessary to arrange the plurality of through holes 120 with regular intervals, and the plurality of through holes 120 may be arranged with irregular intervals.

A hole portion 220 is provided in disk portion 12. Hole portion 220 is a fixing portion for fixing spiral gear 10 to another member. More specifically, spiral gear 10 is connected to another member by inserting a bolt into hole portion 220. Though a plurality of (three) hole portions 220 are provided in this embodiment, an arrangement of hole portion 220 is not specifically limited.

Figure 3:
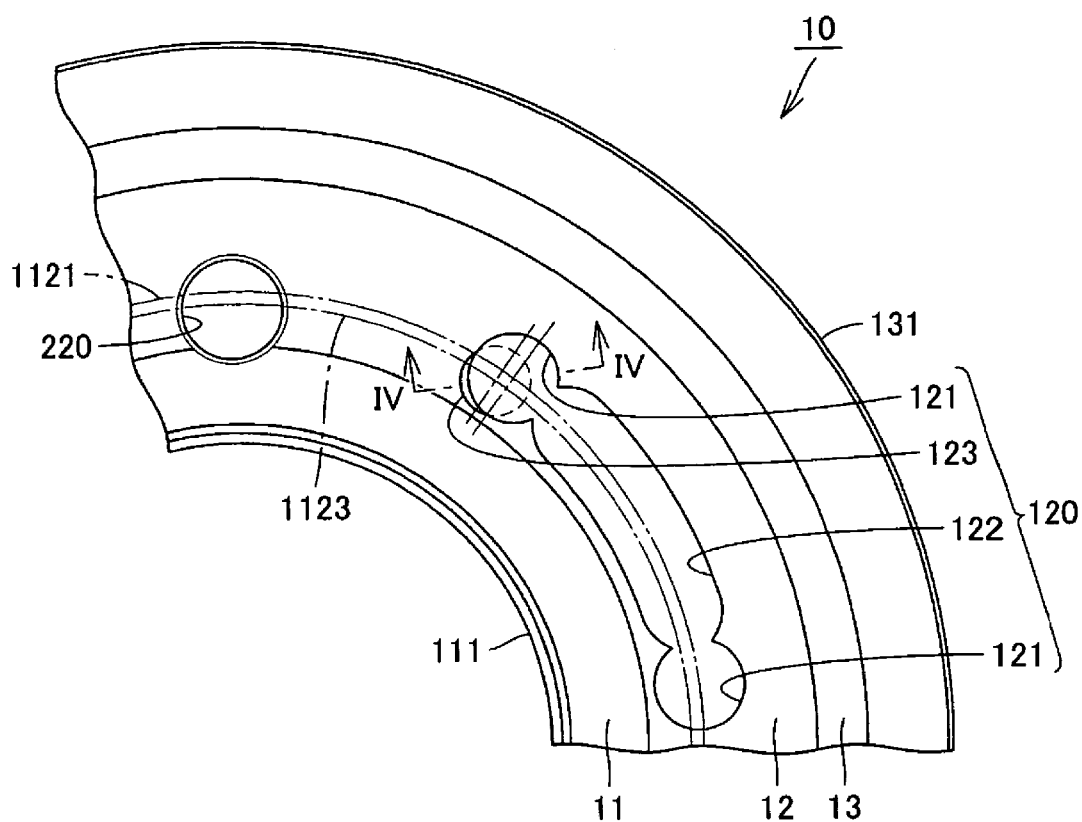
FIG. 3 is an enlarged plan view of a portion enclosed with the line III shown in FIG. 1.

Referring to FIG. 3, through hole 120 has tip holes 121 each having a shape of a substantial perfect circle and communicating portion 122 linking tip holes 121. Chamfer portion 123 is formed in a portion of tip hole 121 opposed to hole portion 220. A position for forming chamfer portion 123 is not limited to that shown in FIG. 3, and chamfer portion 123 is preferably formed in a portion in which a stress tends to concentrate. Chamfer portion 123 is provided in a position deviated from a circular shape constructing tip hole 121. More specifically, while the center of tip hole 121 is located on center line 1121, the center of chamfer portion 123 is located on center line 1123. In FIG. 3, a broken line indicates an elongated outline of chamfer portion 123. The center of this circle is located on center line 1123. Chamfer portion 123 has a radius smaller than that of tip hole 121 to have a sharply curving shape.

Figure 4:
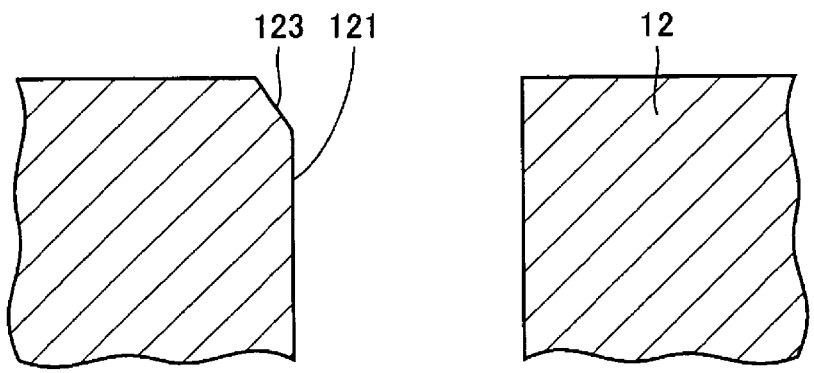
FIG. 4 is a cross-sectional view cut along the line IV-IV shown in FIG. 3.

Referring to FIG. 4, tip hole 121 is formed in disk portion 12 and chamfer portion 123 is formed on an end surface of tip hole 121. Though chamfer portion 123 is formed in an angular shape in FIG. 4, the shape is not limited thereto and chamfer portion 123 may be formed in a rounded shape. That is, chamfer portion 123 may have a curved structure to connect tip hole 121 and a surface of disk portion 12 to form a gentle R-like shape.

A method of manufacturing the spiral gear shown in FIG. 1 will now be described.

Figure 5:
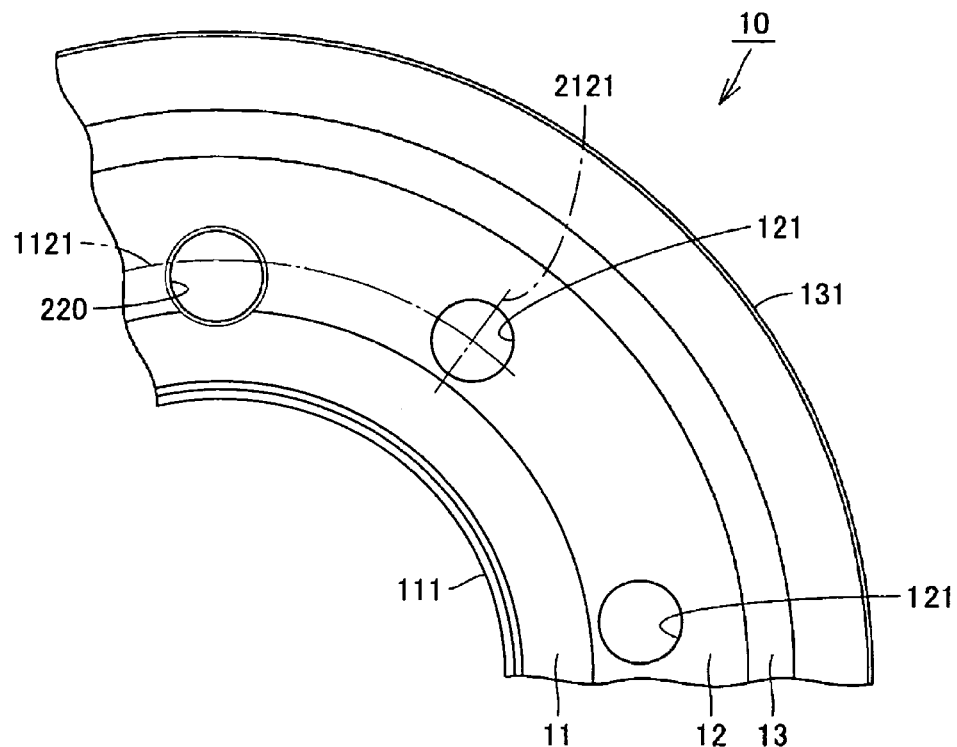
FIG. 5 is a plan view of a first step of a method of manufacturing the spiral gear shown in FIG. 1.

Generally, steel is forged as a preliminary step for forming a gear. Then, blanking, tooth formation and quenching are performed. Referring to FIG. 5, tip hole 121 is then formed in disk portion 12. Various processings such as cutting with a drill or processing with a laser can be adopted to form tip hole 121. Concurrently, hole portion 220 is formed. Tip hole 121 is formed in a circular shape (a columnar shape) having a center on center line 1121.

Figure 6:
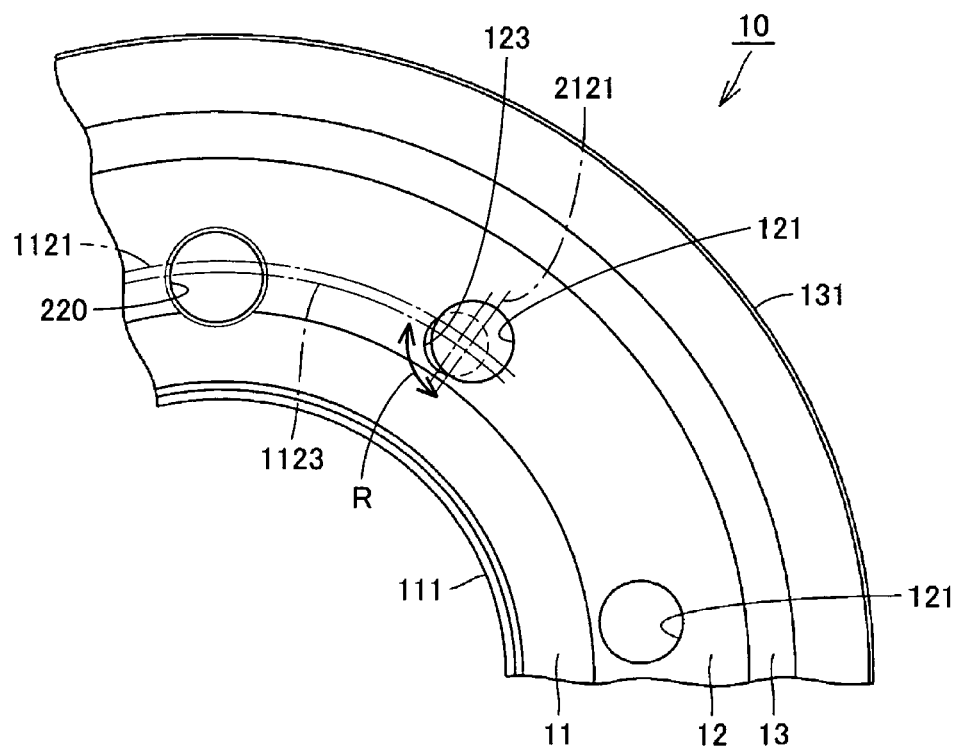
FIG. 6 is a plan view of a second step of the method of manufacturing the spiral gear shown in FIG. 1.

Referring to FIG. 6, chamfering with a deviated center is then performed for a portion of tip hole 121 to form chamfer portion 123. Chamfer portion 123 is formed in a position in which a stress tends to concentrate. More specifically, chamfering with a deviated center is performed in a region R defined by center line 1121 and a straight line 2121. The center of tip hole 121 is located on an intersection of straight line 2121 and center line 1121. Cutting is preferably used as a method of chamfering. Heat treatment is performed after the chamfering.

Referring to FIG. 3, laser processing is performed to connect two tip holes 121 to form communicating portion 122 having a shape of a long hole. An output of the laser, a diameter of the laser and the like during this processing can be changed as appropriate corresponding to a condition such as a thickness and a material of rim portion 13. Communicating portion 122 is formed to extend along center line 1121, and is constructed concentrically with center line 1121. Though a width of through hole 120 in a radial direction is decreased in a connecting portion between communicating portion 122 and tip hole 121 in this embodiment, a shape of the through hole is not limited thereto and the width of through hole 120 in the radial direction may be substantially the same in each portion.

That is, the method of manufacturing spiral gear 10 as a powertrain member according to the present invention is a method of manufacturing a powertrain member including disk portion 12 provided to extend from boss portion 11 in a direction perpendicular to rotation axis 21 and having through hole 120 provided in disk portion 12, which includes the first through hole formation step of forming tip hole 121 as a portion of through hole 120, the step of chamfering a portion of tip hole 121 in a circumferential direction to form chamfer portion 123, the step of performing heat treatment after the chamfering, and the second through hole formation step of forming a desired shape of the through hole by laser processing after the heat treatment to form through hole 120. The step of chamfering includes the step of cutting with a deviation of a center of a prescribed amount from the center of tip hole 121.

In the method of manufacturing a powertrain member constructed as such, only tip hole 121 is formed in an end portion of through hole 120 having a shape of a long hole, heat treatment is performed thereafter, and finally the long hole is formed by cutting with the laser. Therefore, an effect of heat distortion during the heat treatment can be suppressed to a minimum extent. More specifically, when heat treatment is performed after formation of through hole 120, large heat distortion occurs during the heat treatment, which has a large effect on accuracy of the spiral gear (a helical gear). In the present invention, in contrast, since only tip holes 121 in both end portions are formed before heat treatment and communicating portion 122 having a shape of the long hole is formed after the heat treatment, the effect of heat distortion due to the heat treatment can be suppressed to a minimum extent.

As to chamfering, when chamfering is performed in a region of connection between tip hole 121 and communicating portion 122, the laser is diffused during laser processing of the connecting portion between tip hole 121 and communicating portion 122. With this, focus is not achieved and stable cutting becomes difficult. In the present invention, the connecting portion between tip hole 121 and communicating portion 122 (a portion of through hole 120 having a decreased width in the radial direction in FIG. 3) is not chamfered and another portion is chamfered with a deviated center. As a result, subsequent laser processing can be performed readily.

Second Embodiment

Figure 7:
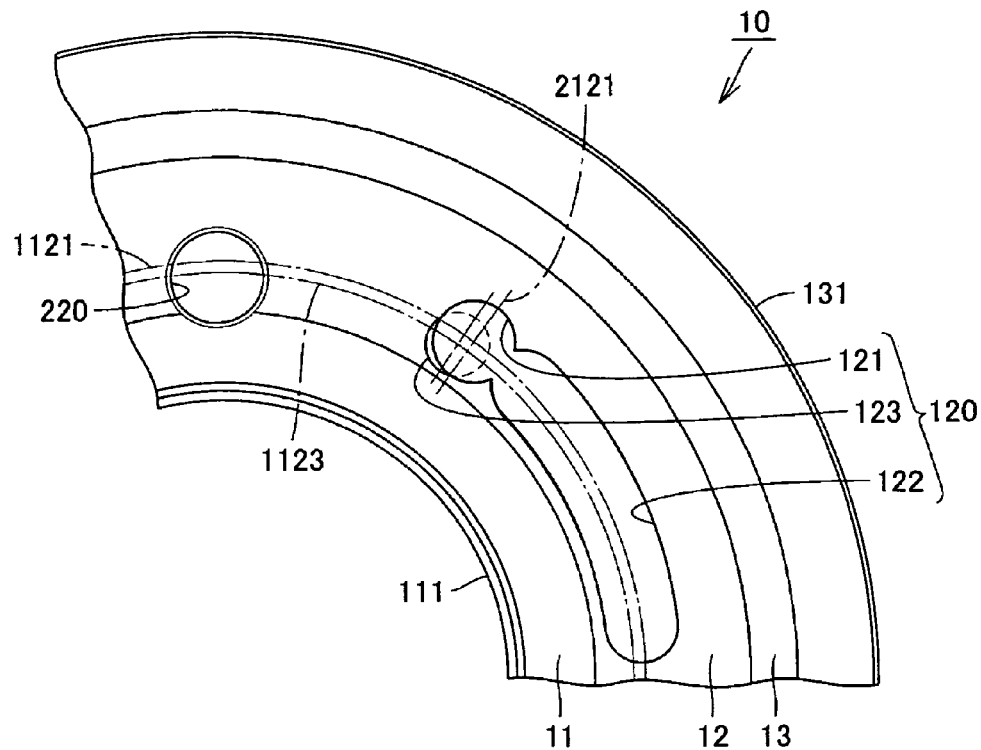
FIG. 7 is a plan view of a spiral gear according to a second embodiment of the present invention.

Referring to FIG. 7, spiral gear 10 according to a second embodiment of the present invention is different from spiral gear 10 according to the first embodiment in that only one tip hole 121 is provided in one through hole 120. While tip holes 121 are provided in both end portions of communicating portion 122 in the first embodiment, tip hole 121 is formed only on one side of communicating portion 122 in the second embodiment. A method of manufacturing through hole 120 in spiral gear 10 according to the second embodiment will now be described. The steps of forming tip hole 121 and forming chamfer portion 123 in a portion of tip hole 121 are similar to those in the first embodiment. Then, communicating portion 122 is formed by laser processing after heat treatment. In this step, communicating portion 122 is formed in a continuous manner. More specifically, laser processing is started from one tip hole 121, continued along center line 1121, and finally the laser is returned to tip hole 121. With this, spiral gear 10 shown in FIG. 7 is completed. Though widths of tip hole 121 and communicating portion 122 (widths in the radial direction) are substantially the same in FIG. 7, the widths are not limited thereto and the width of communicating portion 122 as a communicating hole may be larger or smaller than the width of tip hole 121.

The method of manufacturing the spiral gear according to the second embodiment constructed as such has an effect similar to that of the method of manufacturing spiral gear 10 according to the first embodiment. Furthermore, an occurrence of heat distortion can further be suppressed because a number of tip holes 121 can be decreased.

Third Embodiment

Figure 8:
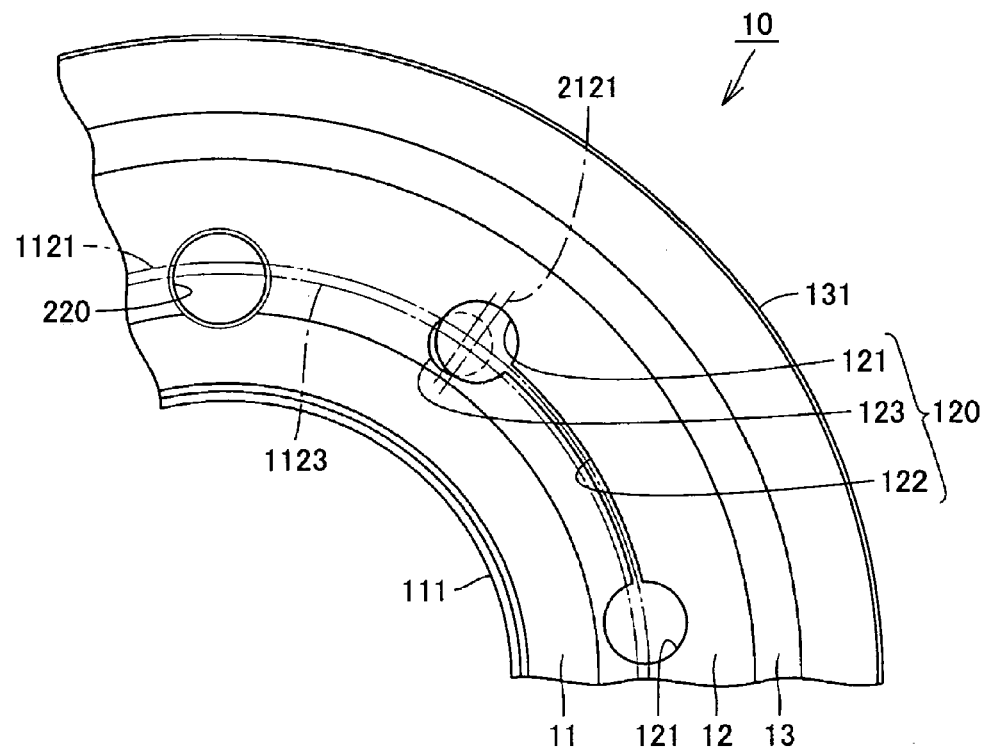
FIG. 8 is a plan view of a spiral gear according to a third embodiment of the present invention.

Referring to FIG. 8, spiral gear 10 according to a third embodiment of the present invention is different from spiral gear 10 according to the first embodiment in that communicating portion 122 has a decreased width. The width of communicating portion 122 is set to be a maximum width which can be processed in one laser processing step and which is larger than a diameter of the laser. Communicating portion 122 has a slit-like shape connecting two tip holes 121. Communicating portion 122 is located on center line 1212.

A method of manufacturing the spiral gear shown in FIG. 8 will now be described. Referring to FIG. 8, the steps of forming tip hole 121 and chamfer portion 123 in disk portion 12 are similar to those in the first embodiment. Thereafter, heat treatment is performed. Communicating portion 122 is formed by laser processing after the heat treatment. Communicating portion 122 is formed by operating the laser from one tip hole 121 to the other tip hole 121 to have an arc shape along center line 1212. It is to be noted that, communicating portion 122 does not necessarily have the arc shape along center line 1212 and may have a serpentine shape across center line 1212 or a straight shape.

The method of manufacturing spiral gear 10 according to the third embodiment constructed as such has an effect similar to that of the method of manufacturing the spiral gear according to the first embodiment. Furthermore, through hole 120 can be manufactured within a short time because communicating portion 122 is formed in one operation step of the laser.

Fourth Embodiment

Figure 9:
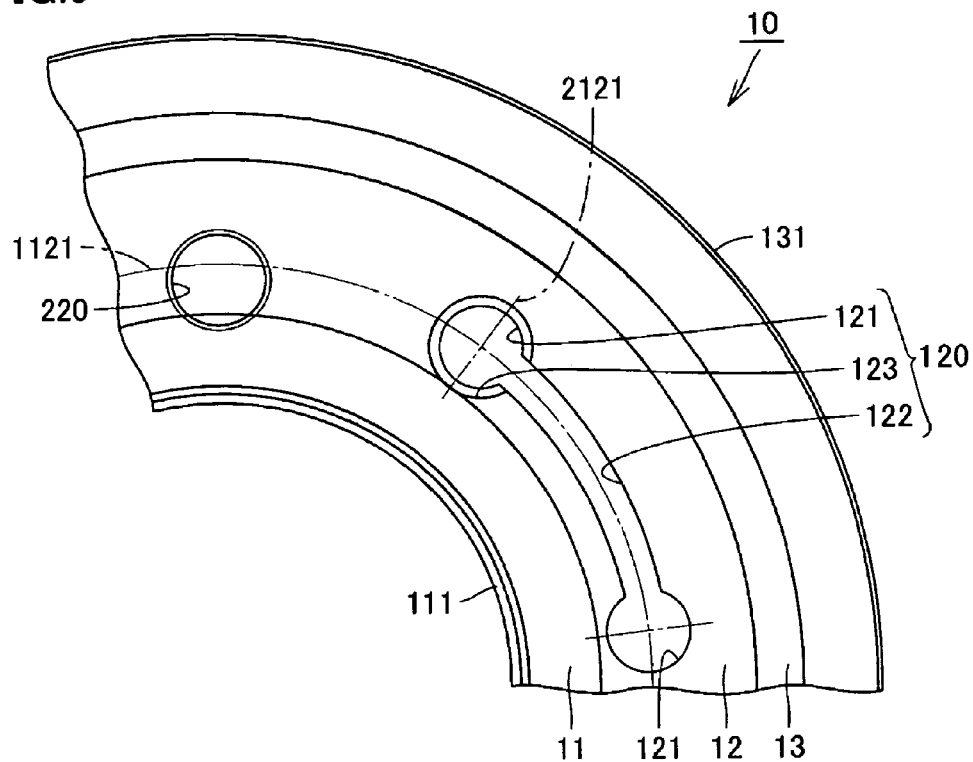
FIG. 9 is a plan view of a spiral gear according to a fourth embodiment of the present invention.

Referring to FIG. 9, in a method of manufacturing a spiral gear according to a fourth embodiment of the present invention, the step of chamfering is different from that in the method of manufacturing the spiral gear according to each of first to third embodiments. In FIG. 9, chamfer portion 123 is formed concentrically with tip hole 121. Chamfer portion 123 is provided on a periphery of tip hole 121 to be a tapered surface. It is to be noted that, chamfer portion 123 is formed on at least one of front and back sides of disk portion 12. More preferably, chamfer portion 123 is formed on both of front and back surfaces of disk portion 12. This point is similarly applied in each of first to third embodiments. Since chamfer portion 123 is formed concentrically with tip hole 121, the center of chamfer portion 123 is located on center line 1121. Though it is described that two tip holes 121 are provided in one through hole 120 and only one of the tip holes is chamfered, a construction is not limited thereto and both of tip holes 121 may be chamfered. This point is also similarly applied in each of first to third embodiments.

Figure 10:
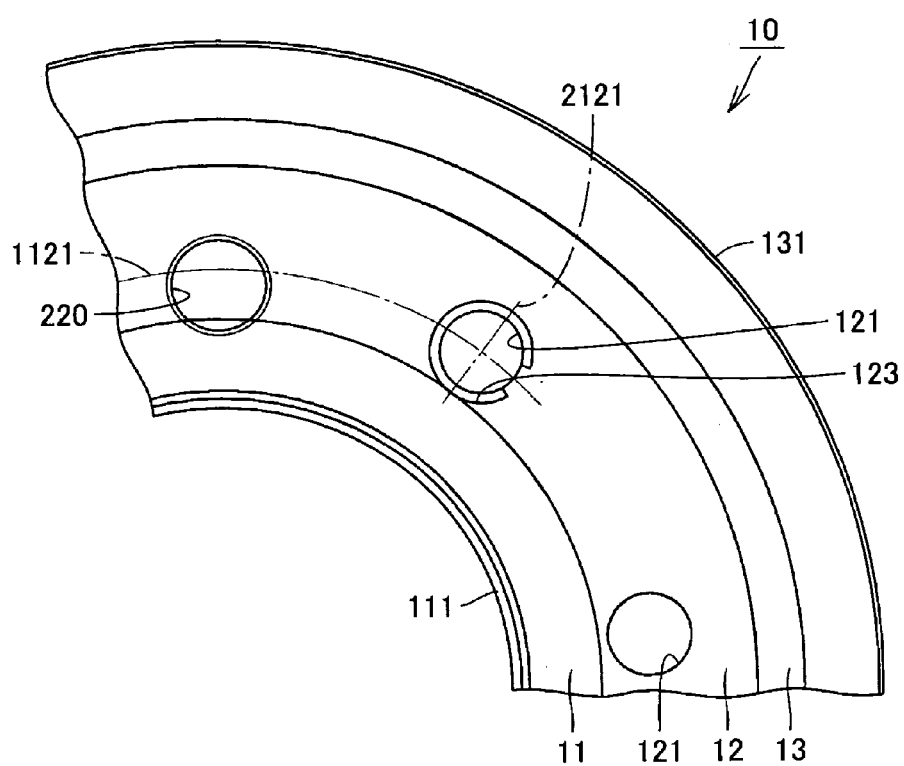
FIG. 10 is a plan view for describing a method of manufacturing the spiral gear according to the fourth embodiment of the present invention.

A method of manufacturing the spiral gear shown in FIG. 9 will now be described. Referring to FIG. 10, tip hole 121 is formed in disk portion 12. Chamfer portion 123 is formed on a peripheral portion of tip hole 121. Chamfer portion 123 is formed by cutting, for example, so as to cover a periphery of tip hole 121 except for a portion of tip hole 121. The portion not chamfered in this step is a portion subjected to laser processing in a subsequent step. Chamfering of the portion to be subjected to laser processing is not preferable because it becomes difficult to achieve focus. Therefore, chamfer portion 123 is formed in a portion other than the portion to be subjected to laser processing. Though chamfer portion 123 is formed in all of the portion other than the portion to be subjected to laser processing in FIG. 10, it is not necessary to form the chamfer portion in all of the portion. Referring to FIG. 9, communicating portion 122 is then formed by operating the laser from the portion not chamfered. Communicating portion 122 is formed in a bridge-like shape connecting two tip holes 121.

The method of manufacturing spiral gear 10 according to the fourth embodiment constructed as such has an effect similar to that of the method of manufacturing the spiral gear according to each of the first to third embodiments.

Though embodiments of the present invention have been described above, various modifications of the embodiments described here are possible. First, a material for attenuating vibrations may be embedded in through hole 120. As an example, a material such as a resin having an effect of attenuating vibrations may be embedded in through hole 120 to actively attenuate vibrations.

In addition, though through hole 120 is provided in the spiral gear in the present invention, the through hole may also be provided in a disk portion of a spur gear, a bevel gear or the like.

Furthermore, the through hole may be provided in a planetary carrier besides the gear.

The present invention can be applied to a powertrain mechanism such as an automatic transmission, a manual transmission, a continuously variable transmission, an actuator, a transfer device, or a hub device having a reduction function.

The present invention can further be applied to a portion transmitting mechanical power output from an engine of a length side type or a transverse type.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a powertrain member including a disk portion provided to extend from a boss portion in a direction perpendicular to a rotation axis and having a through hole provided in the disk portion, comprising:

forming a first tip hole and a second tip hole of said through hole;

chamfering a portion of said first tip hole in a circumferential direction;
performing heat treatment after chamfering; and
forming a communicating portion which connects said first tip hole and said second tip hole of the through hole by laser processing after heat treatment.

2. The method of manufacturing a powertrain member according to claim 1, wherein a center of said first tip holes is provided on a center line and said communication portion extends along said center line and is concentric with said center line.

3. A method of manufacturing a powertrain member including a disk portion provided to extend from a boss portion in a direction perpendicular to a rotation axis and having a through hole provided in the disk portion, comprising:
   forming at least a portion of said through hole;
   chamfering a portion of said through hole in a circumferential direction;
   performing heat treatment after chamfering; and
   forming a desired shape of the through hole by laser processing after heat treatment, wherein said chamfering includes cutting the through hole with a deviation of a center of a prescribed amount from a center of the through hole.

\* \* \* \* \*